US007340902B2

(12) United States Patent
Jimenez Haertel et al.

(10) Patent No.: US 7,340,902 B2
(45) Date of Patent: Mar. 11, 2008

(54) METHOD FOR OPERATING AN AIR-BREATHING ENGINE

(75) Inventors: Carlos Jimenez Haertel, Munich (DE); Sasha Savic, Wettingen (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 11/335,701

(22) Filed: Jan. 20, 2006

(65) Prior Publication Data

US 2006/0137356 A1    Jun. 29, 2006

Related U.S. Application Data

(63) Continuation of application No. PCT/EP2004/051502, filed on Jul. 15, 2004.

(30) Foreign Application Priority Data

Jul. 22, 2003    (DE) ................ 103 33 208

(51) Int. Cl.
    *F02C 3/30*    (2006.01)
(52) U.S. Cl. .......................... 60/775
(58) Field of Classification Search ............ 60/775, 60/728, 39.3, 39.53
    See application file for complete search history.

(56) References Cited

U.S. PATENT DOCUMENTS 5,353,585 A * 10/1994 Munk ..................... 60/775

| | | | |
|---|---|---|---|
| 5,867,977 A | 2/1999 | Zachary et al. | |
| 6,216,443 B1 | 4/2001 | Utamura | |
| 6,318,066 B1 | 11/2001 | Skowronski | |
| 6,634,165 B2 * | 10/2003 | Tomlinson et al. | 60/39.3 |
| 6,805,483 B2 * | 10/2004 | Tomlinson et al. | 374/144 |
| 6,923,003 B2 * | 8/2005 | Willems et al. | 60/775 |
| 6,973,772 B2 * | 12/2005 | Hatamiya et al. | 60/39.511 |
| 2001/0022078 A1 * | 9/2001 | Horii et al. | 60/39.182 |
| 2003/0029157 A1 | 2/2003 | Utamura | |
| 2006/0218931 A1 * | 10/2006 | Haertel et al. | 60/775 |
| 2006/0248897 A1 * | 11/2006 | Haertel et al. | 60/775 |

FOREIGN PATENT DOCUMENTS

FR    1563749    3/1969
WO    2004/025102 A1    3/2004

OTHER PUBLICATIONS

International Search Report dated Nov. 15, 2004.

* cited by examiner

*Primary Examiner*—William H. Rodriguez
(74) *Attorney, Agent, or Firm*—Buchanan Ingersoll & Rooney PC

(57) ABSTRACT

When operating an air-breathing engine, a liquid is injected in atomized form into an air intake duct of the engine. A measurement apparatus for determining the injected drop size or the drop concentration is arranged in or on the intake duct downstream of the location of the injection. These measured values are input into a control system, which controls suitable parameters of the injection apparatus in such a manner that the determined variables are controlled to desired values or into desired value ranges.

19 Claims, 4 Drawing Sheets

METHOD FOR OPERATING AN AIR-BREATHING ENGINE

CROSS REFERENCE TO RELATED APPLICATIONS

Figure 1:
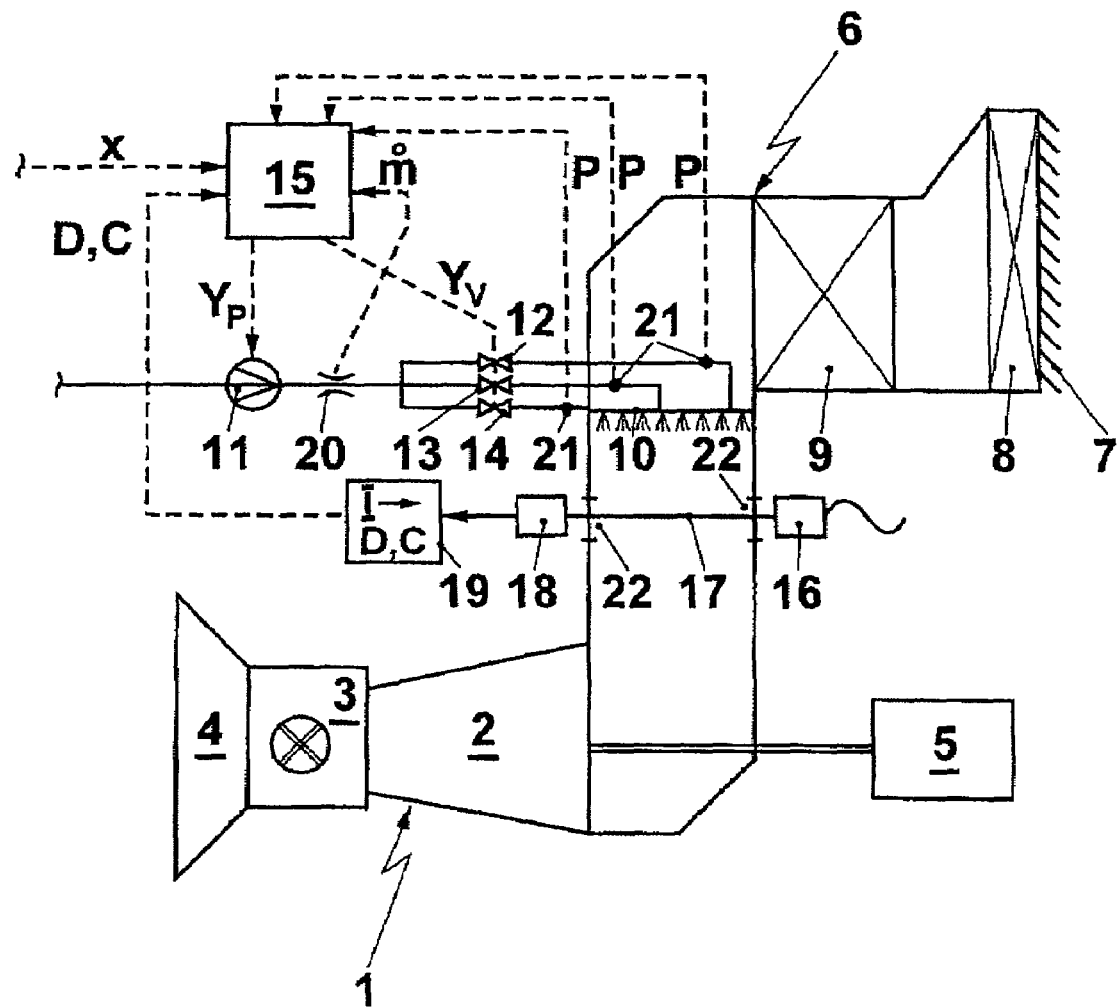

This application claims priority under 35 U.S.C. § 119 to German Application 103 33 208.1 filed on Jul. 22, 2003, and as a continuation application under 35 U.S.C. § 120 to PCT/EP2004/051502 filed as an International Application on Jul. 15, 2004 designating the U.S., the entire contents of which are hereby incorporated by reference in their entireties.

FIELD OF THE INVENTION

The present invention relates to a method for operating an engine.

BACKGROUND OF THE INVENTION

The prior art has disclosed methods for positively influencing the performance data of engines with internal combustion, for example a gas turboset, by evaporative cooling before and/or during the compression of the combustion air. For this purpose, it is customary for water or another liquid to be injected in finely atomized form into the gas stream which has been drawn in. The overriding significance of the atomization quality and the homogeneous distribution of the liquid introduced was recognized as early as in FR 1 563 749. The drop size directly influences the flow-following capacity and the evaporation time of the drops. When drops enter a turbo-compressor, the number of drops which strike the compressor blades, and the potentially erosive effect thereof, increases with the drop size. This means that if the drop size exceeds a defined limit value, the negative effects rise disproportionately. Therefore, U.S. Pat. No. 6,216,443 indicates injecting drops of a size of from 1 to 50 μm diameter into the compressor of a gas turboset. This size depends on a large number of different parameters, such as inter alia nozzle geometry, atomization pressure or the flow conditions following atomization. These parameters are subject to potential changes in long-term operation: erosive or blocking of atomizer nozzles are only some of the processes which can change the atomization characteristics of an injection apparatus in the long term.

US 2001/002078 and WO 2004/025102 have disclosed methods in which a mass flow of liquid is injected in atomized form into the air intake duct of an engine. The injection is operated in a closed control circuit by means of sensors arranged downstream of the injection, and the injected mass flow is adjusted until a desired value for the measured values is reached. The variables measured in this case, however, also do not provide any information as to the atomization characteristics.

SUMMARY OF THE INVENTION

The invention seeks to remedy this problem. The invention characterized in the claims is based on the object of providing a method of the type described in the introduction which is able to avoid the drawbacks of the prior art. In particular, it is intended to avoid potentially negative effects of a deviation in the liquid injection from its design point.

Therefore, the core concept of the invention is for the injection of liquid to be operated in a closed control circuit, with a property of the spray which is generated, for example its drop size or drop size range, being used as a guide variable. Accordingly, the core concept of the invention is to record significant parameters, i.e. primarily the drop size or the drop size range and/or the drop concentration of the liquid mist which is generated, by metrology, and to input the measured values obtained in this way into the operating control of the liquid injection, in order thereby to perform, for example, protective actions in the event of limit values being exceeded or adjusting actual values of the measured parameters to desired values or into desired values ranges. It is highly advantageous to define a tolerance band around the desired value. Defining a tolerance band around the desired value or alternatively a control dead band around a current value prevents the closed control circuit realized in this way from reacting excessively sensitively, which otherwise constitutes a potential source of control circuit instabilities. The desired value or the desired value range may in this case be defined so as to be variable, in the sense that the desired values or desired value ranges are defined, for example, as a function of the current engine operating state. In one embodiment of the method according to the invention, the drop size and optionally the concentration distribution are recorded as a function of the mass flow of liquid injected at a reference instant, in particular in the new state of the injection apparatus, and defined as desired values. An actual value/desired value deviation in, for example, the drop size which exceeds a certain magnitude then can be used as a measure of the wear.

Operating control of the injection apparatus is generally present in any case in order to control its operating parameters, such as for example the mass flow injected or the atomization admission pressure, and/or to keep them within a predetermined desired band.

It will be automatically understood that the measurement location in or on the intake duct must be arranged downstream of the atomization apparatus.

In one embodiment of the invention, measured values are recorded at a plurality of locations of the intake duct, in particular over its cross section. In a further embodiment, integrating measurement methods, which deliver mean values over a certain measurement field, are used. By way of example, transmitted light techniques are used to determine mean values over the transilluminated zone. In this case too, it is once again possible for measurements to be recorded at a plurality of locations and at different angles simultaneously and for the local distribution to be reconstructed by means of tomographic methods.

In an embodiment of the invention which is particularly suitable when using pressure atomizers, the atomization admission pressure of the liquid is altered as a function of the measured values, and in particular the admission pressure is increased in the event of a negative desired value/actual value deviation in the drop size and the admission pressure is reduced in the event of a positive desired value/actual value deviation in the drop size. In this context, the desired value/actual value deviation is defined by subtracting the actual value from the desired value; accordingly, a negative desired value/actual value deviation or control deviation means that the actual value of the drop size is greater than the desired value, and a positive desired value/actual value deviation or control deviation means that the actual value is lower than the desired value. The control action described therefore involves either simultaneously altering the mass flow of the atomized liquid or having to alter the geometry or number of atomizer nozzles in order to keep this mass flow constant. Therefore, on the one hand, in the event of a negative control deviation in the drop size, the passage cross section of the atomizer nozzles can be reduced in size, and in the event of a positive control deviation in the drop size the passage cross section of the atomizer nozzles can be increased in size. The passage cross section can be altered, for example, by conical inner bodies being introduced a different distance into the atomizer opening. The effect can also be achieved by nozzles and/or nozzle groups being selectively switched on or off, in such a manner that in the event of a negative control deviation in the drop size nozzles and/or nozzle groups are switched off, and conversely in the event of a positive deviation in the drop size nozzles and/or nozzle groups are selectively switched on. In another embodiment of the invention, the apparatus which is used to inject the drops has nozzles and/or nozzle groups with different atomization properties, in such a manner that some of the nozzles are intended for finer atomization and others of the nozzles are intended for less fine atomization; in this case, the diameter of the drops can be kept within a desired value range or within a tolerance band around a desired value by switching between the nozzles and/or nozzle groups.

The selected switching between nozzles and/or nozzle groups can of course also take place in other ways. If the measurement of the drop size and in particular of the drop concentration takes place at different points in the intake duct, it is possible for nozzles and/or nozzle groups arranged at different locations over the cross section of the intake duct to be switched on and/or off in order to achieve a predetermined concentration profile, in particular an approximately even distribution of drop size and drop concentration over the cross section of the intake duct.

When using atomizers with auxiliary media, in particular air-assisted atomizers, it is possible, without significantly affecting the mass flow of liquid, to vary the size of the atomized drops by varying the pressure of the auxiliary medium, so as to adjust it to the desired value.

Another way of controlling the drop size consists in admixing additives which influence the surface tension to the liquid that is to be atomized. Therefore, if the liquid to be atomized is water, it is possible for example to reduce the surface tension by adding soap-like additives. Therefore, to achieve smaller drops in the event of an actual value of the drop size which is higher than the desired value, it is possible to simply increase the quantity of the additive which lowers the surface tension that is metered in, and vice versa.

In an advantageous embodiment of the invention, the injection of liquid is switched off in the event of a certain drop size being exceeded or in the event of a certain deviation in the concentration profile from the desired profile being exceeded. If the specified data can no longer be complied with, this means that there is a latent risk to the engine, for example a turbo-compressor of a gas turboset arranged downstream, and there is a clear indication of damage or excess wear to the injection apparatus, for example on account of erosion to the injection nozzles. The control will therefore be operated as a safety device or what is known as a limit controller.

Optical methods have proven to be particularly suitable measurement methods for carrying out the method according to the invention, it is in this case possible to use both transmitted light and scattered light measurement methods. Scattered light measurement methods which record scattered light near the upstream direction have proven particularly suitable. By way of example, a particle size measuring appliance with which the person skilled in the art will be in any case familiar, for example in the style of the commercially available Malvern Particle Sizer, can be used. A multi-wavelength extinction method which is inexpensive to implement, can also advantageously be used; such a method, given a suitable design, is able to determine at least the drop concentration and drop size as well as the distribution range of the drop size. Furthermore, it is possible to use image evaluation methods which allow a locally resolving measurement for example as stereoscopic video images or with position-selective illumination.

Transmitted light measurement methods, for example, generally deliver mean values over the entire transilluminated zone. It is in this case also possible to reconstruct a local resolution by using tomographic methods.

Further advantageous embodiments of the invention will emerge in light of the subclaims and the exemplary embodiments described below.

BRIEF DESCRIPTION OF THE DRAWING

The invention is explained in more detail below on the basis of exemplary embodiments illustrated in the drawing, in which, in detail:

FIG. 1 shows a gas turboset which can be operated in accordance with the invention;

FIGS. 2 to 5 show examples of control circuits which can be implemented in accordance with the invention.

Components which are not directly necessary have been omitted, in order to facilitate gaining an understanding of the invention. The exemplary embodiments are to be understood as purely instructive and are not to be used to restrict the invention as characterized in the claims.

DETAILED DESCRIPTION

In accordance with FIG. 1, a gas turboset 1 comprises a compressor 2, a combustion chamber 3 and a turbine 4. A useful power is used to drive a load, for example generator 5, for example via a shaft (indicated without a reference number). The compressor 2 draws air out of the environment, and this air is compressed and passed into the combustion chamber 3, where a compressed hot gas is generated, which is then expanded in a work-performing manner in the turbine 4. Gas turbines and other air-breathing engines are in many applications equipped with special intake paths which allow a defined location for the air inlet to be selected and the intake air to be suitably prepared. The gas turboset illustrated in FIG. 1 has an intake duct 6, through which the intake air flows, upstream of the compressor inlet. This intake duct comprises inlet lamellae 7, the purpose of which is to prevent the ingress of coarse dirt, in particular rainwater. This is followed downstream by an air filter 8 and a muffler 9. An injection apparatus 10, which can be used to inject a liquid, for example water, in the form of a fine spray mist into the intake duct, is arranged downstream of the muffler 9. The drops of water which have been introduced in some cases, depending on the arrangement of the injection apparatus and the humidity of the intake air, evaporate upstream of the compressor and therefore cool the intake air, which leads to an increase in the air density and, given otherwise constant conditions, an increase in the air mass flow in the gas turboset. If a very large amount of liquid is injected, drops of water penetrate into the compressor, evaporate during the compression and thereby effect intensive internal cooling of the compressor, with positive effects on the performance data of the gas turboset. As mentioned in the introduction, when using this method it is important to achieve fine atomization and a uniform distribution of the liquid mist in the intake duct. It is of great importance in particular to ensure the quality of atomization, since as the drop size increases the flow following capacity of the drops decreases and the potential erosive action on the compressor components increases. It is therefore desirable to verify that the drop diameter is below a permissible maximum value by means of an operating measurement, and if appropriate to use control actions to act on the atomization accordingly. On the other hand, excessively fine atomization entails very high levels of energy consumption, and especially if pressure atomizers are used, the erosive action of the liquid on the atomizer nozzles increases as the drop diameter decreases. Moreover, the drop size has a crucial influence on the atomization rate and therefore the depth of penetration of a drop into the compressor. For these reasons, it is desirable for the drop size, expediently also as a mean value, or the drop size range to be recorded in real time and to effect control to a desired value range. If appropriate, it may also be important to record the distribution of the drop concentration over the cross section of the flow duct and to set it to a predetermined desired concentration profile, for example an even distribution. The injection apparatus 10 is supplied with liquid by a pump 11. The mass flow of liquid is distributed between different nozzles and/or nozzle groups of the injection apparatus by means of shut-off and/or throttling members 12, 13, 14. A control unit 15 is used to control operation of the injection apparatus. In the simplest operating method, which is familiar from the prior art, the control unit 15 receive one or more control variables X from the control device, which is not illustrated and is also not relevant to the invention, of the gas turboset, and calculates control variables $Y_P$ and $Y_V$ for actuating the pump 11 and/or the shut-off and/or throttling members 12, 13, 14 in such a way that the system is operating in an open control loop. In a first further development, the system comprises a mass flow measurement location 20 and pressure measurement locations 21, which delivers feedback of the mass flow m and the pressure p, preferably the atomization admission pressure. Although feedback of this nature can be used to adjust mass flow and pressures in a closed control circuit to desired values, it is not possible to make a direct statement as to the drop size and drop concentration. According to the invention, therefore, there is a measuring apparatus for determining the drop size and/or the drop concentration. In the exemplary embodiment, this apparatus comprises a light source 16, a receiver 18 and an evaluation unit 19. Originating from the light source 16, a measurement beam 17 radiates through the flow duct containing the liquid mist. Optical access is realized by windows 22. The light is scattered by the liquid mist and absorbed, to a negligible degree in the case of water and visible light. The receiver 18 records the transmitted residual intensity and/or scattered light, preferably at different angles. If sufficient measured values are recorded, it is possible to determine the drop size D, at least as a mean value, and gradually also the concentration C of the drops in the evaluation unit 19 from the measurement signals. The person skilled in the art will be familiar with optical measurement methods of this type, for example the Malvern measuring appliance or multi-wavelength extinction measurements, which if appropriate also allow information to be ascertained as to the distribution width of the drop size range. It is also readily possible for the receiver or a plurality of receivers 18 not to be arranged coaxially with the light source or with a plurality of light sources 16 and the measurement beam, in which case only scattered light at certain angles is recorded. If sufficient measurement signals are recorded, it is possible to calculate the drop size D and/or the drop concentration C from the measured intensity values I in the evaluation unit 19. Other methods familiar to the person skilled in the art as well as scattered and/or transmitted light measurement methods can also be used to determine the drop size and/or drop concentration. These variables are then passed onto the control unit 15, which compares the values determined in this way, i.e. primarily the drop size and/or drop concentration at a measurement position, but if appropriate also a measured drop size range and/or the distribution of the drop size and/or the concentration over a cross section of the flow duct, with desired values or desired value ranges, and if appropriate carries out suitable control actions to bring the measured actual values back into line with the desired values. In this case, the drop size can preferably be set, in the case of air-assisted atomizers or atomizers which work with other auxiliary media, by varying the pressure of the auxiliary medium, i.e. for example the atomizer air pressure.

Figure 2:
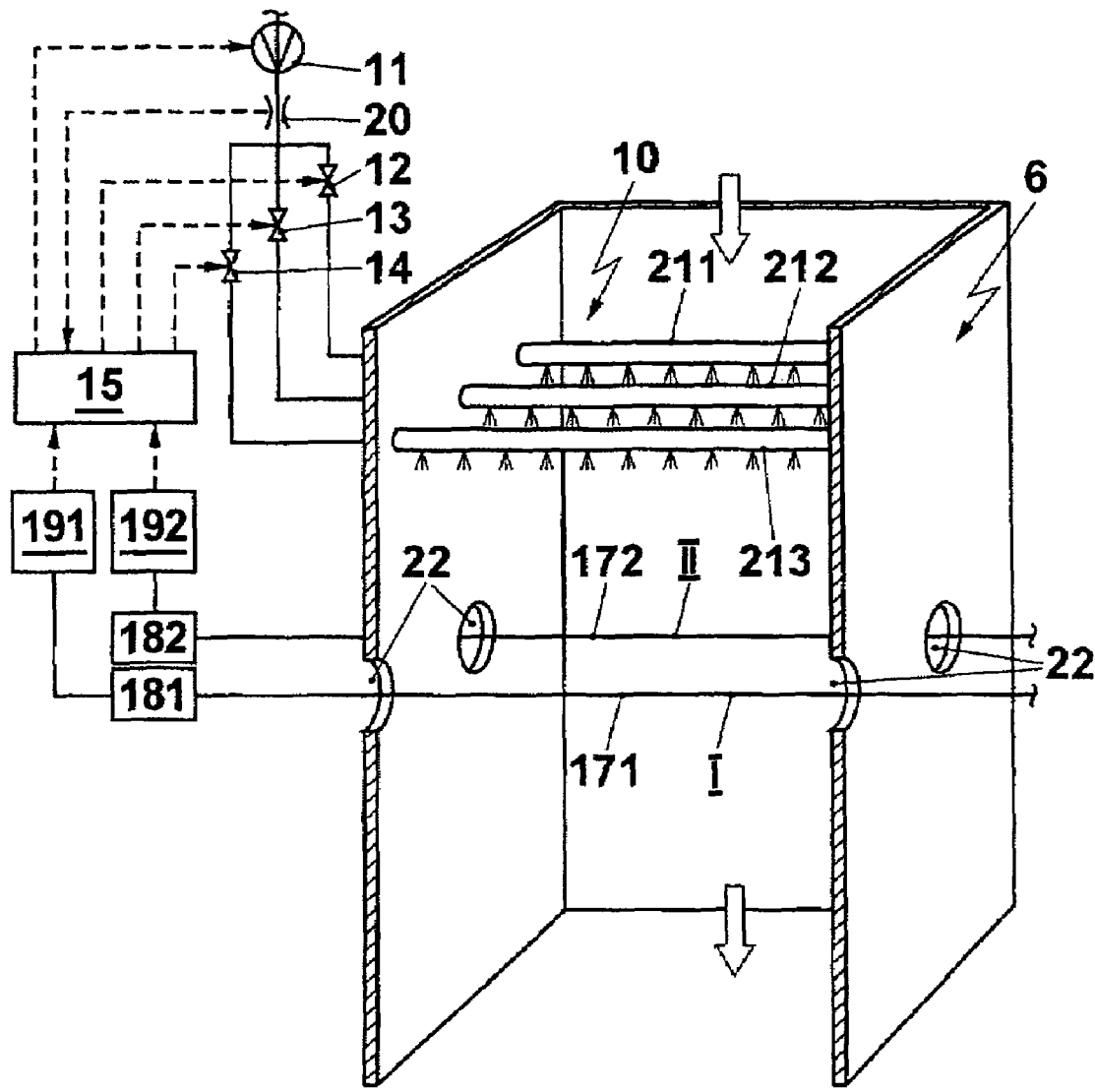

In the case of pressure atomizers, the drop size is determined primarily by the atomization admission pressure. Varying this admission pressure without at the same time altering the mass flow of the liquid requires the total free cross section of flow of the injection nozzles to be varied. One way of doing this is for individual nozzles and/or groups of nozzles to be selectively switched on and/or off. This is illustrated in FIG. 2. In accordance with FIG. 2, an injection apparatus 10, which comprises a number of nozzle tubes (of which nozzle tubes 211, 212, 213 are illustrated) is arranged in an intake duct 6. The nozzle tubes can be supplied with liquid independently of one another by means of shut-off and/or throttling members 12, 13, 14; the liquid is delivered by a pump 11. It will be clearly understood that it is also possible for a number of nozzle tubes to be combined to form a group and to be actuated jointly by means of a common shut-off and/or throttling member. The direction of flow through the duct 6 is indicated by arrows without any reference numerals. A droplet mist (not shown) is formed downstream of the injection apparatus 10. The duct 6 has metrology access points, in this case windows 22, which are arranged downstream of the injection apparatus and which provide access for preferably optical measurements 171, 172. In one embodiment, the metrology access points are arranged a distance of at least two to three duct transverse dimensions downstream of the injection apparatus, so that the spray mist has reached a steady state. The arrangement illustrated also enables measured values to be obtained at a plurality of locations over the transverse extent of the flow duct. Measured value pick-ups 181 and 182 record the measurement data, which are forwarded to evaluation units 191 and 192 which calculate, for example, a drop size in a measurement volume from the simple measurement signals. If a suitable measurement technique is used, it is also possible to calculate the concentration or at least a relative concentration. The size and position of the measurement volume are in this case entirely dependent on the measurement method used; transmitted light techniques as integrating measurement methods form, for example, mean values over the entire transilluminated region, whereas scattered light methods tend toward punctiform measurement. Image evaluation methods can also be used to realize both integral and spatially resolved measurements. It will be clear that in the example illustrated measured values can be recorded at a plurality of positions I, II over the cross section of the flow duct. The data calculated in the evaluation units are passed onto the control unit 15. If, for example, it is established that the drop diameter is outside the desired value range, control actions are initiated. If the measured drop size is above the desired value, at least one of the shut-off members 12, 13, 14 is closed, while in a further control circuit, comprising the pump 11, the mass flow measurement location 20 and the control unit 15, the mass flow in the now smaller cross section of flow through the injection apparatus is constantly adjusted to the desired value. In this case, of course, the atomization admission pressure rises, and therefore smaller drops are produced. If, on the other hand, the drop size is below the desired value range, additional nozzle groups are taken into operation, with the result that the atomization admission pressure drops. This prevents excessive erosion of the nozzles and excessive loading of the pump 11. Another option would also be to switch between nozzle groups which have nozzles which, for example on account of the different diameters, are intended to generate different sizes of drops. Therefore, by selectively choosing the nozzles and/or nozzle groups which are in operation, it is possible to ensure that, for example, drops of equal size are present in the same concentration at all measurement positions, or it is possible to change to a different desired value for the distribution of drop size and concentration over the cross section of the flow duct in the closed control circuit. For example, to alter the drop size it is possible for nozzles and/or nozzle groups to be switched on and/or off in the manner which has been described, and the injection site can if appropriate be displaced to a location where a comparatively low concentration of the drops has been measured. It is also possible for nozzles and/or nozzle groups which are intended to generate sprays of differing fineness and can be actuated separately to be arranged in the injection apparatus. The generation of sprays of different fineness, given the same admission pressure, can be effected in a particularly simple way by using different nozzle geometries. By way of example, the nozzles on the tubes 211, 212, 213 could be provided for different drop sizes, in such a way that switching between the nozzle tubes varies the drop size.

Figure 3:
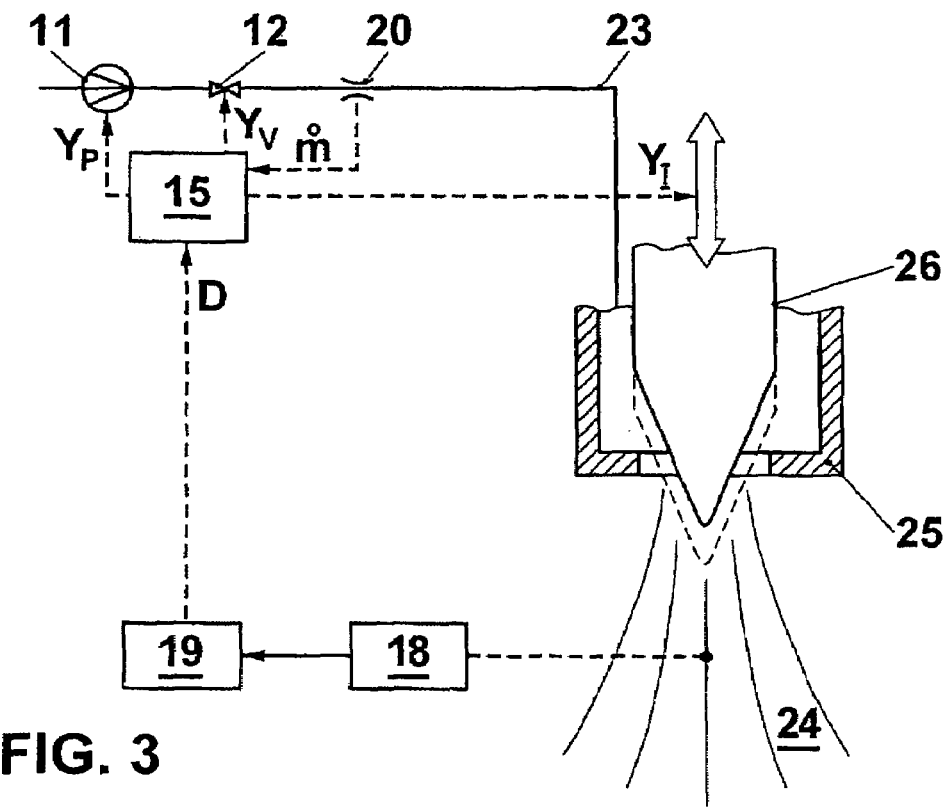

The text which follows presents a number of preferred ways of controlling the drop size. In accordance with FIG. 3, a mass flow of liquid that is to be atomized is fed to a pressure atomizer nozzle 25 via a feedline 23. A mass flow measurement position 20 is used to determine the mass flow m, which is processed by the control unit 15 and adjusted to a desired value by control actions on the pump 11 and the shut-off and throttling member 12. A spray mist 24 forms downstream of the nozzle opening. A measurement pick-up 18 and an evaluation unit 19 record the drop size at a suitable position within the spray mist. The drop size D is likewise passed onto the control unit 15, where the measured actual value is compared with a desired value or a desired value range. A control variable $Y_1$ is formed as a function of the control deviation and is used, by way of an actuator (not shown), to make a conical inner body 26 of the nozzle move axially, either by passing further into the nozzle opening or moving back so as to open up a larger cross section. In particular, if the actual value of the drop size exceeds the desired value or the desired value range, the inner body 26 is moved further into the nozzle opening, to the position indicated in dashed lines, in order to obtain a finer aerosol, and conversely it is moved further out of the nozzle opening to increase the actual value of the drop size.

Figure 4:
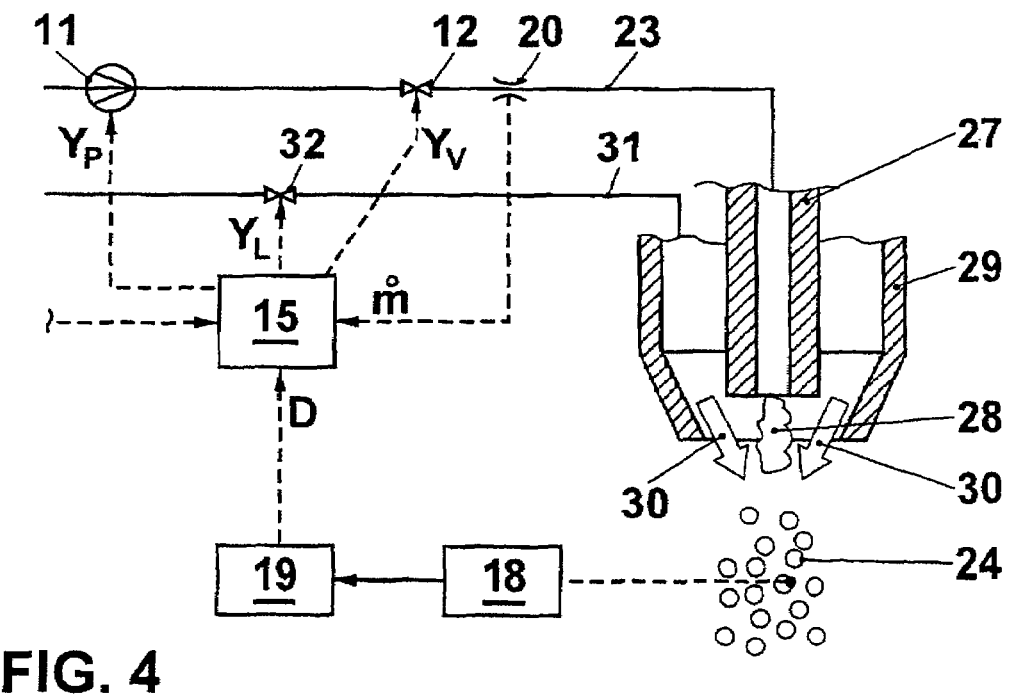
Figure 5:
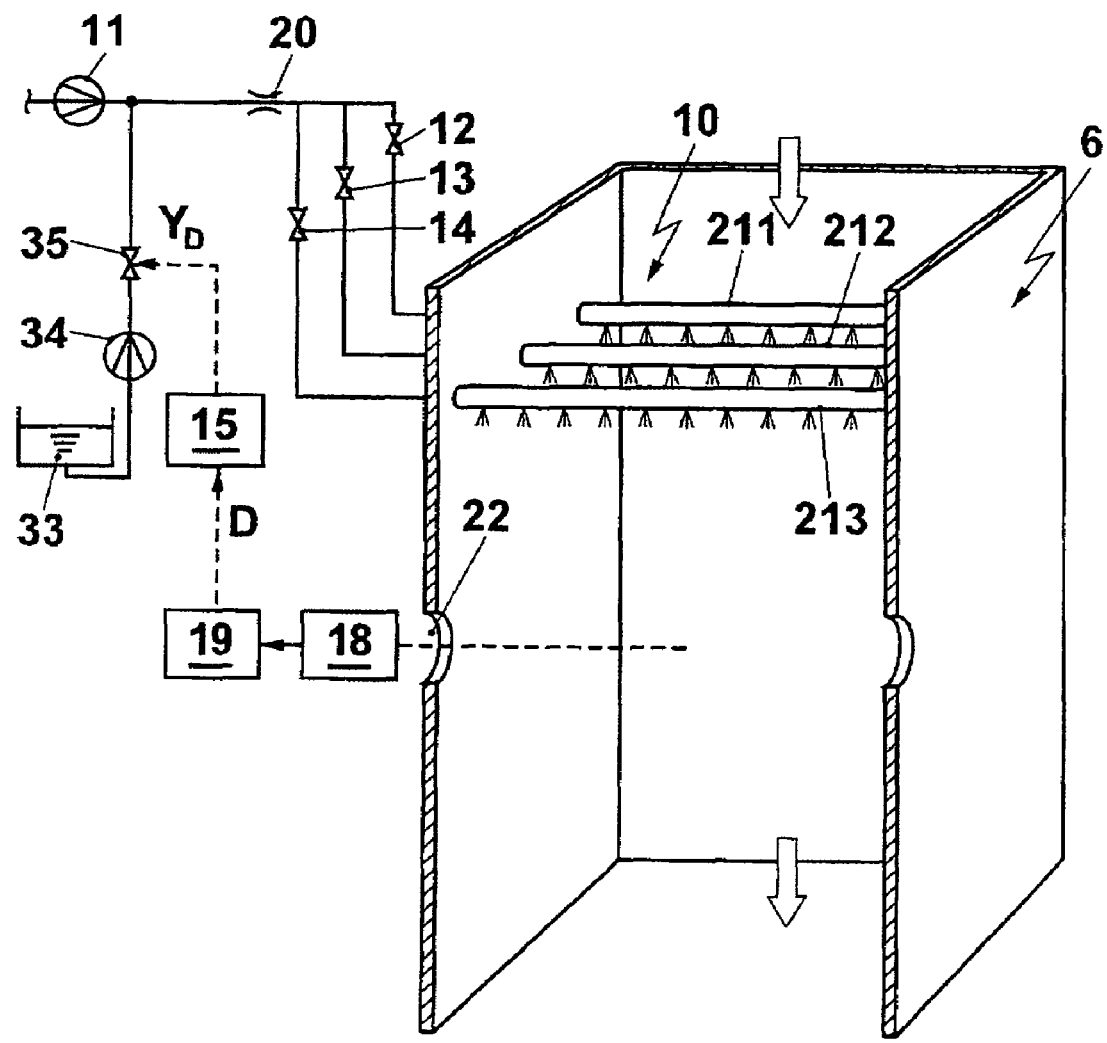

FIG. 4 illustrates the control of an atomizer nozzle which is assisted by auxiliary media, in particular an air-assisted atomizer nozzle. In the example illustrated, the liquid that is to be atomized is passed through a liquid tube 27 at relatively low pressure and forms liquid jets or large drops 28 at the opening. An atomizer gas flow 30, which atomizes the jets 28 to form a liquid mist 24, is passed through a cladding tube 29. One significant advantage of this design of nozzle is that the mass flow of liquid can be set independently of the drop size, which is primarily determined by the velocity of the atomizer gas. The liquid is supplied via the feedline 23. A mass flow measurement location 20, the pump 11 and the shut-off and throttling member 12 together with the control unit 15 form a control circuit for controlling the mass flow of liquid. The atomizer gas is supplied via the line 31, and its admission pressure, and therefore the velocity of the atomizer gas flow, can be set by means of the throttling member 32. A measurement pick-up 18 and analysis unit 19 once again determine the drop size D of the aerosol, which in the control unit 15 is compared with the desired values. A control variable $Y_L$ which acts on the throttling member 32 is formed as a function of the control deviation. In particular, if the actual drop size is larger than the desired value, the throttling member is opened further, with the result that the admission pressure of the atomizer gas is increased, and conversely it is closed if the actual value of the measured drop size is smaller than the desired value. In this way, the drop size which is generated in the closed control circuit is also controlled. In another embodiment of the invention, illustrated in FIG. 5, the drop size or drop size range is altered by a quantity of an additive which alters the surface tension of the liquid that is to be atomized being deliberately admixed into the liquid feedline from a tank 33. By way of example, a quantity of a detergent can be deliberately admixed to water that is to be atomized, in order to reduce the surface tension and therefore to obtain smaller drops. The additive is delivered via the pump 34, and the mass flow is controlled by the control element 35. A measurement pick-up 18 and an analysis unit 19 determine the drop size D in the flow duct. Control unit 15 compares actual value and desired value of the drop size and depending on the control deviation forms the control variable $Y_D$, which acts on the throttling member 35 and therefore controls the admixing of additive. In this case, this control takes place in such a way that if the drop size actual value is above the desired value, the surface tension is reduced, and if the actual value is below the desired value, the surface tension is increased.

A common factor in all the exemplary embodiments presented above is that the liquid injection is operated with at least one measured property of the spray that is generated, in particular the drop size, as a guide variable in the closed control circuit.

In light of the exemplary embodiments presented above, further possible embodiments of the invention which are also covered by the scope of the patent claims will also readily become apparent to the person skilled in the art. In particular, the invention is not restricted to being used in gas turbosets. Image evaluation methods which likewise allow a local resolution by the application of stereoscopy or selective illumination of certain regions, are also suitable for use as the measurement method.

The invention may also be useful per se even if no liquid or only a limited quantity of liquid drops is to penetrate into the engine, for example the compressor of a gas turboset. The measurement apparatus is then advantageously arranged only a small distance upstream of the inlet, and the drop concentration is measured. If this concentration exceeds a limit value, the injected mass flow is reduced.

The invention claimed is:

1. A method for operating an air-breathing engine, comprising the steps of:

injecting a mass flow of atomized liquid in the form of a liquid mist into an air intake duct of the engine;

determining, using a measuring apparatus arranged in or on the intake duct downstream of the location of the injection of the liquid, at least: the size of the liquid drops of the liquid mist, the concentration of the liquid drops of the liquid mist, or both;

inputting the measured values into a control system of the injection apparatus used; and carrying out actions on a control of the injection apparatus used for injecting the liquid as a function of the measured values.

2. The method as claimed in claim 1, wherein at least one measured actual value is adjusted to a desired value and/or to a desired value range by suitable control actions on the control of the liquid injection apparatus.

3. The method as claimed in claim 2, wherein the desired value and/or the desired value range are defined so as to be variable.

4. The method as claimed in claim 1, wherein the admission pressure of the liquid is altered as a function of the measured values, and the admission pressure is increased in the event of a negative desired value/actual value deviation in the measured drop size and/or the admission pressure is reduced in the event of a positive desired value/actual value deviation in the drop size.

5. The method as claimed in claim 1, wherein the pressure of a gas used to atomize the liquid is altered as a function of the measured values, and the pressure of the gas is increased in the event of a negative desired value/actual value deviation in the drop size and/or reduced in the event of a positive desired value/actual value deviation in the drop size.

6. The method as claimed in claim 1, wherein the geometry of nozzles used for the atomization is altered as a function of the measured values, with the cross section of the atomizer opening of the nozzles being reduced in size in the event of a negative desired value/actual value deviation in the drop size and increased in size in the event of a positive desired value/actual value deviation in the drop size.

7. The method as claimed in claim 6, wherein, to adjust the atomizer opening cross section, conical inner bodies are introduced to a different distance into the atomizer opening.

8. The method as claimed in claim 1, wherein nozzles and/or nozzle groups are selectively switched on and/or off as a function of the measured values.

9. The method as claimed in claim 8, wherein, in the event of a control deviation in the measured drop size, nozzles and/or nozzle groups are selectively switched on and/or off, with the number of nozzles being reduced in the event of a negative desired value/actual value deviation in the drop size and/or nozzles and/or nozzle groups being selectively switched on in the event of a positive desired value/actual value deviation in the drop size.

10. The method as claimed in claim 8, wherein, in the event of a control deviation in the measured drop size, a switching takes place between nozzles and/or nozzle groups with different atomizer properties, with a switch to nozzles for finer atomization taking place in the event of a negative desired value/actual value deviation in the drop size and/or a switch to nozzles for less fine atomization taking place in the event of a positive desired value/actual value deviation in the drop sizes.

11. The method as claimed in claim 1, wherein the drop concentration is measured at a plurality of locations in the intake duct, and nozzles and/or nozzle groups arranged at different positions are switched on and/or off in order to achieve a predetermined desired concentration profile, which is an at least approximately even distribution of the drops over the cross section of the intake duct.

12. The method as claimed in claim 1, wherein additives for influencing the surface tension are metered in prior to the injection as a function of the measured drop size of the liquid to be injected, and the metering takes place such that the surface tension drops in the event of a negative desired value/actual value deviation in the drop size and the metering takes place such that the surface tension rises in the event of a positive desired value/actual value deviation in the drop size.

13. The method as claimed in claim 1, wherein the liquid injection is switched off in the event of a threshold value for the drop size being exceeded and/or in the event of an excessive deviation in a measured concentration profile over the cross section of the intake duct.

14. The method as claimed in claim 1, wherein measured values are recorded at a plurality of measurement positions in the intake duct over the cross section of the intake duct.

15. The method as claimed in claim 1, wherein the measured values are recorded using an integrating measurement method which delivers mean values over a certain measurement field.

16. The method as claimed in claim 15, wherein a plurality of measured values are recorded simultaneously, and a local resolution of the measured values is reconstructed using tomographic methods.

17. The method as claimed in claim 1, wherein an optical measurement method, which is a scattered light and/or transmitted light measurement, is used for determining, for the injected liquid mist, at least one of the drop concentration, the injected drop size, and the distribution range of the drop size.

18. The method as claimed in claim 1, wherein an image evaluation method is used for determining, for the injected liquid mist, at least one of the drop concentration, the drop size, and the distribution range of the drop size.

19. The method as claimed in claim 1, wherein the injected mass flow of liquid is kept constant during the action on the control.

* * * * *